US012663511B2

(12) United States Patent　　　(10) Patent No.: US 12,663,511 B2
Wolf　　　　　　　　　　　　　　　(45) Date of Patent: Jun. 23, 2026

(54) SUB-ELEMENTAL PHASE CENTER CONTROL FOR HIGH-RESOLUTION RF SCENE PROJECTION

(71) Applicant: Rockwell Collins, Inc., Cedar Rapids, IA (US)

(72) Inventor: Jeremiah D. Wolf, Atkins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 360 days.

(21) Appl. No.: 18/236,217

(22) Filed: Aug. 21, 2023

(65) Prior Publication Data

US 2025/0067844 A1　　Feb. 27, 2025

(51) Int. Cl.
G01S 7/40　　　　(2006.01)
H01Q 3/36　　　　(2006.01)

(52) U.S. Cl.
CPC ............. G01S 7/4095 (2021.05); H01Q 3/36 (2013.01)

(58) Field of Classification Search
CPC ................................ G01S 7/4095; H01Q 3/36
See application file for complete search history.

(56) References Cited

U.S. PATENT DOCUMENTS

| | | | | |
|---|---|---|---|---|
| 4,965,602 A | * | 10/1990 | Kahrilas | H01Q 25/00 |
| | | | | 342/372 |
| 4,974,920 A | | 12/1990 | Chovan et al. | |
| 8,334,803 B1 | * | 12/2012 | Urkowitz | G01S 7/4052 |
| | | | | 342/168 |
| 10,594,031 B1 | * | 3/2020 | West | H01Q 25/02 |
| 11,397,405 B2 | | 7/2022 | Ozcan et al. | |

| | | | | |
|---|---|---|---|---|
| 2012/0212372 A1 | * | 8/2012 | Petersson | H01Q 3/26 |
| | | | | 343/893 |
| 2013/0038486 A1 | * | 2/2013 | Lee | G01S 7/412 |
| | | | | 342/192 |
| 2016/0085211 A1 | | 3/2016 | Kim et al. | |
| 2016/0127023 A1 | * | 5/2016 | Athley | H04B 7/0617 |
| | | | | 375/267 |
| 2017/0227636 A1 | * | 8/2017 | Moulder | G01S 13/887 |
| 2018/0337739 A1 | * | 11/2018 | Petersson | H04B 17/27 |

(Continued)

FOREIGN PATENT DOCUMENTS

RU　　　　2549884 C1 * 5/2015

OTHER PUBLICATIONS

A.W. Doerry, et al. "Antenna phase center locations in tapered aperture subarrays," Sandia National Laboratories, SPIE 2016 Defense & Security Symposium, vol. 9829, https://www.osti.gov/servlets/purl/1340050 (Year: 2016).*

(Continued)

*Primary Examiner* — William Kelleher
*Assistant Examiner* — Noah Yi Min Zhu
(74) *Attorney, Agent, or Firm* — Suiter Swantz IP

(57)　　　　　ABSTRACT

A system and method for projecting a scene using sub-elemental control of antenna phase center locations is disclosed. The system and method may include an antenna array configured to transmit the projected scene including a plurality of antenna phase center locations. The system and method may include a controller operatively coupled to the antenna array. The controller may be configured to determine antenna phase center location weightings corresponding to the plurality of antennas based on distances between perceived/desired lateral positions of particular antenna phase center locations and an actual lateral position of the particular antenna. The antenna phase center location weightings may be configured to shift the projected scene a shift distance that is less than an antenna pitch between the plurality of antennas.

18 Claims, 3 Drawing Sheets

(56)         References Cited

U.S. PATENT DOCUMENTS

| | | | | |
|---|---|---|---|---|
| 2019/0137603 | A1* | 5/2019 | Peacock | G01S 7/4052 |
| 2020/0011968 | A1* | 1/2020 | Hammes | G01S 13/931 |
| 2020/0272100 | A1 | 8/2020 | Yu et al. | |
| 2020/0320731 | A1* | 10/2020 | Sheen | G06F 3/04815 |
| 2021/0050667 | A1* | 2/2021 | Ray | H04B 7/0617 |
| 2021/0239822 | A1* | 8/2021 | Vollbracht | G01S 13/426 |
| 2022/0069461 | A1* | 3/2022 | Huang | H01Q 1/246 |
| 2022/0407225 | A1* | 12/2022 | Kohtani | H01Q 1/3233 |
| 2023/0043791 | A1 | 2/2023 | Supikov et al. | |
| 2023/0258770 | A1* | 8/2023 | Loffe | G01S 7/4082 |
| | | | | 342/169 |
| 2024/0288545 | A1* | 8/2024 | Holzinger | G01S 7/4086 |
| 2024/0337679 | A1* | 10/2024 | Happ | G01S 7/40 |
| 2025/0164628 | A1* | 5/2025 | Nishimura | G01S 7/4052 |

OTHER PUBLICATIONS

T. Dallmann, et al. "ATRIUM: A Radar Target Simulator for Complex Traffic Scenarios, " 2018 IEEE Mtt-S International Conference on Microwaves for Intelligent Mobility (ICMIM), Munich, Germany, 2018, pp. 1-4, doi: 10.1109/ICMIM.2018.8443515. (Year: 2018).*

W. Shi, L. Liu, Y. Shen, H. Chen and Z. Yu, "Dynamic Target Simulation System for Automotive Millimeter Wave Radar," 2021 Photonics & Electromagnetics Research Symposium (PIERS), Hangzhou, China, 2021, pp. 423-428, doi: 10.1109/PIERS53385.2021.9694845. (Year: 2021).*

Q. Zhao, et al. "A new modeling of radar target based on multi-scattering centers and implementation of radar target HWIL simulation system," 2008 International Conference on Microwave and Millimeter Wave Technology, Nanjing, China, 2008, pp. 212-215, doi: 10.1109/ICMMT.2008.4540343 (Year: 2008).*

A. Diewald, B. Nuss, M. Pauli and T. Zwick, "Arbitrary Angle of Arrival in Radar Target Simulation," in IEEE Transactions on Microwave Theory and Techniques, vol. 70, No. 1, pp. 513-520, Jan. 2022, doi: 10.1109/TMTT.2021.3106268. (Year: 2022).*

A.W. Doerry, et al. "Antenna phase center locations in tapered aperture subarrays", Sandia National Laboratories, SPIE 2016 Defense & Security Symposium, vol. 9829, https://www.osti.gov/servlets/purl/1340050.

* cited by examiner

SUB-ELEMENTAL PHASE CENTER CONTROL FOR HIGH-RESOLUTION RF SCENE PROJECTION

TECHNICAL FIELD

The present disclosure relates generally to radio frequency (RF) scene projection, and, more particularly, to an array of antennas configured to project a scene. As a non-limiting example, the array of antennas may be used to emulate an RF reflection from a simulated aircraft for testing radar receivers.

BACKGROUND

Radio Frequency (RF) scene generation may require the precise control of projected objects in a three-dimensional space. The density at which this can be controlled is important, as it controls the fundamental resolution and spacing of the emulated targets or objects. The fundamental resolution of a projected object may be bounded by the antenna's physical properties, such as its lattice spacing and distance from a receiver (e.g., Unit Under Simulation or Test).

Increasing resolution by using a higher number of antennas in increased density may result in higher hardware costs.

Therefore, there exists a desire for a system that addresses the issues above.

SUMMARY

A system for projecting a scene using sub-elemental control of antenna phase center locations is disclosed in accordance with one or more illustrative embodiments of the present disclosure. In one illustrative embodiment, the system may include an antenna array configured to transmit the projected scene including a plurality of antenna phase center locations. In another illustrative embodiment, the system may include a controller operatively coupled to the antenna array. In another illustrative embodiment, the controller may be configured to determine antenna phase center location weightings corresponding to the plurality of antennas based on distances between perceived/desired lateral positions of particular antenna phase center locations and an actual lateral position of the particular antenna. In another illustrative embodiment, the antenna phase center location weightings may be configured to shift the projected scene a shift distance that is less than an antenna pitch between the plurality of antennas.

In a further aspect, the antenna array may be further configured to receive a received transmission. In another aspect, the system may be configured to generate the projected scene based on the received transmission. In another aspect, the generating of the projected scene may be based on the received transmission to emulate a simulated reflection of the received transmission off a simulated scene. In another aspect, the system may be configured to respond to a pulsed radar transmission. In another aspect, the antenna phase center location weightings may comprise at least one of amplitude weightings or phase weightings. In another aspect, the system may be configured to iteratively move an antenna phase center location between particular antennas by generating successive antenna phase center location weightings corresponding to successive frames. In another aspect, the arrangement of the plurality of antennas may be rectangular. In another aspect, an antenna pitch between the plurality of antennas may comprise a first antenna pitch orthogonal to a second antenna pitch. In another aspect, the antenna phase center location weightings of a particular antenna may be based on adjacent antenna phase center locations corresponding to adjacent antennas. In another aspect, the system may be configured for non-uniform aperture illumination. In another aspect, the non-uniform aperture illumination may comprise tapered non-uniform aperture illumination. In another aspect, the antenna phase center location weightings may be based on the non-uniform aperture illumination.

A method for controlling antenna phase center location of a projected scene using radio frequency (RF) signals is disclosed in accordance with one or more illustrative embodiments of the present disclosure. In one illustrative embodiment, the method may include determining antenna phase center location weightings corresponding to a plurality of antennas in an antenna array. In another illustrative embodiment, the antenna phase center location weightings corresponding to a particular antenna may be based on distances between perceived lateral positions of particular antenna phase center locations and an actual lateral position of the particular antenna. In another illustrative embodiment, the method may include generating a signal for the antenna array based on the antenna phase center location weightings. In another illustrative embodiment, the method may include directing a transmission of the projected scene, including a plurality of antenna phase center locations, via the antenna array by transmitting the signal, wherein the signal is a radio frequency (RF) signal.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
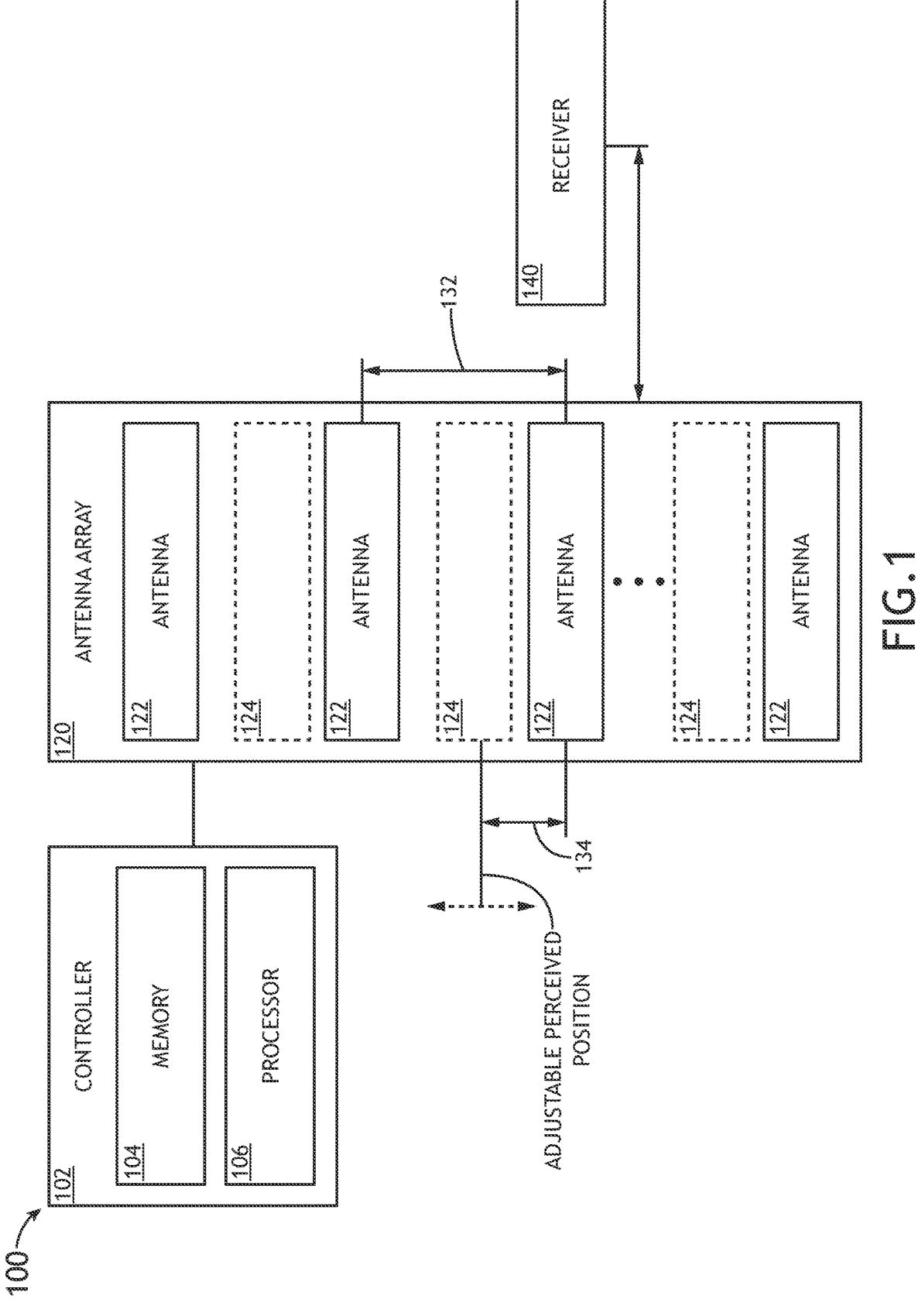
FIG. 1 is a conceptual block diagram of a system configured for scene projection and adjustable antenna phase center locations, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, embodiments herein are directed to a system and method for sub-elemental (e.g., less than the distance between two adjacent antennas) control of antenna phase center location of a projected scene. Rather than simple image processing of shifting a scene over by the (entire) distance between antennas (e.g., analogous to a whole pixel shift), the antenna phase center locations may be shifted by a distance that is less than the whole spacing between the antennas. This allows for smooth movement, and in a sense a higher resolution, by precisely controlling (e.g., smoothly shifting) the antenna phase centers to locations that are different from nominal antenna locations from which the signals emanate from. For example, the antenna phase center location of a projection system may be shifted by differentially weighting each antenna by surrounding antenna phase center locations such that a combined waveform, as received, appears as if the antenna phase center locations were shifted to positions between each antenna. In this way, each antenna phase center's location may be controlled by multiple antennas and each antenna may control for many antenna phase center locations. In this regard, projection systems may more smoothly shift objects in the virtual scene rather than being forced to shift objects whole-antenna phase center location distances. For instance, rather than it taking two "frames" to shift a projected virtual object two antenna phase center locations-one antenna phase center location at a time-smaller sub-elemental shifts may be used, such as may correspond to 10 steps per antenna phase center location shift (20 frames total) or more, where each shift is one-tenth of an antenna phase center location spacing. This may allow for more smoothly shifting the projected scene, which may in essence create a smoothness that gives a sense of higher resolution. Note that the previous description is only one example, and a variety of embodiments may be used for providing a variety of results. For example, less than one-tenth of antenna phase center location spacing may be used, or shifting different areas of the projected scene at different rates (e.g., two entities approaching each other at different speeds)

In some embodiments, a test receiver (e.g., prototype receiver) is tested to ensure its abilities are accurate, calibrated, suited for particular types of detections, and/or the like. For example, a pulsed radar receiver may be tested. Rather than testing with real targets (e.g., vehicles in motion), it may be more practical, cost-effective, and repeatable to test with a simulated environment. For example, a "scene" may be projected at the receiver using RF antennas in an arrangement to emulate a reflected radar pulse. A problem with other projection systems is that the resolution of the system may be limited by the number of antennas, where each antenna corresponds to a single possible antenna phase center location. Increasing the resolution and set of possible antenna phase center locations may involve increasing the number of antennas, which may lead to higher costs. Embodiments of the present disclosure may address at least some of these concerns.

FIG. 1 illustrates a conceptual block diagram of a system 100 configured for scene projection and sub-elemental adjustable antenna phase center location, in accordance with one or more embodiments of the present disclosure.

In some embodiments, the system 100 includes a controller 102, which includes a memory 104 and a processor 106. For example, the controller 102 may be used (e.g., via program instructions stored on memory) to simulate radar pulse reflections, determine/calculate antenna phase center locations/weightings for sub-elemental antenna phase center location control, and/or the like as disclosed herein. The controller 102 may be operatively coupled to the antenna array 120, such as for directing transmissions (e.g., RF transmissions) to be sent via the antenna array 120. For instance, the controller 102 may be hardwired or wirelessly communicatively coupled to the antenna array 120.

In some embodiments, the system 100 includes an antenna array 120 configured to transmit a projected scene including a plurality of (perceivable) antenna phase center locations 124, wherein the antenna array 120 comprises a plurality of antennas 122 in an arrangement (e.g., any arrangement such as a rectangular arrangement of antennas or any other shape such as square, circular, irregular, and/or the like). Embodiments may generally include any number of antennas 122 such as, but not necessarily limited to, hundreds, thousands, millions, and/or the like. The antennas may be separated by a distance referred to as an antenna pitch 132. A perceived (e.g., perceivable) location 124 of an antenna phase center of the antenna phase center locations 124 may be adjusted/shifted a distance referred to as a shift distance 134. For example, the shift distance 134 may be measured from the antenna 122 or from the last location 124 of the antenna phase center.

In some embodiments, the antenna array 120 arrangement includes any arrangement shape and spacing/pitch. For example, the arrangement may include a first pitch along a first direction (e.g., horizontal) and a second pitch along a second direction (e.g., vertical) that is orthogonal to the first direction. The antenna phase center location weightings may be configured to account for any differences in pitch, arrangement and the like.

In some embodiments, the system 100 is configured to test a receiver 140 (e.g., test receiver), such as by projecting the antenna phase center locations 124 towards the receiver 140. For example, a radar receiver 140 may be tested. The system 100 may be configured to receive a received transmission (e.g., a radar pulse from a radar receiver 140), such as by using the antennas 122 as receiving antennas. The system 100 may be configured to simulate the received transmission reflecting off a three-dimensional representation of the projected scene 160 (e.g., using simulation software configured to simulate RF bounces off of three-dimensional objects). The reflection may, in simulation, be traced back to a view (e.g., the antenna array) and converted into a two-dimensional representation of what would be received from such a viewpoint. For example, the two-dimensional representation may be mapped to a resolution with a number and arrangement of antenna phase center locations corresponding to what is projectable from the antenna array 120. In this way, the system 100 generates the projected scene 160 (e.g., a mapping of antenna phase center locations to a simulated scene in a two-dimensional representation) based on the received transmission. Overall, this is an example of generating a projected scene 160 based on a received transmission (from a receiver 140) to emulate a simulated reflection of the received transmission off a simulated scene (stored on memory 104). In this way, the system 100 may be configured to respond to signals such as a pulsed radar transmission. This may be used to test radar equipment by transmitting using the radar equipment and then receiving a simulated/emulated reflection back from the antenna array 120. Benefits include not needing to fly real-world aircraft, saving time and costs, and increasing the amount of testing that may be performed.

Figure 2:
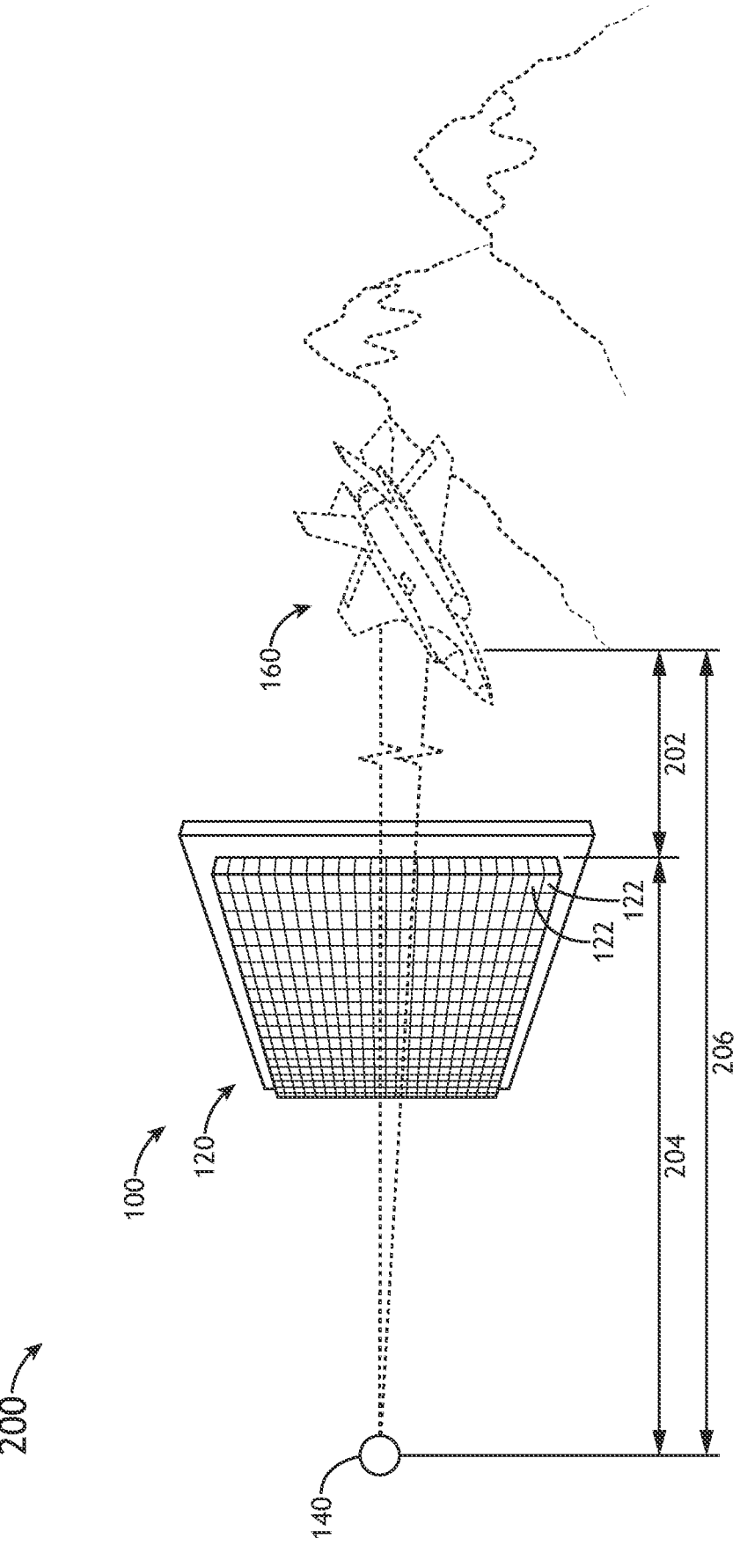
FIG. 2 is a diagram of the system and a projected scene and a test receiver, in accordance with one or more embodiments of the present disclosure.

FIG. 2 illustrates a diagram 200 of the system 100 and a projected scene 160 and a test receiver 140, in accordance with one or more embodiments of the present disclosure.

In the system 100, the receiver 140 may be at a set-off distance 204 from the antenna array 120. The antenna array 120 may not be in-plane with a projected scene 160. The antenna array 120 may itself be at a distance, an array-to-projection distance 202, from a scene 160. The total projected distance 206 of a scene 160 may be a combination of the set-off distance 204 and the array-to-projection distance 202.

In some embodiments, the system 100 is configured to determine antenna phase center location weightings corresponding to the antennas 122. For example, particular antenna phase center location weightings corresponding to a particular antenna 122 may be based on distances (e.g., shift distance s134) between perceived (e.g., desired to be perceived) lateral positions of particular antenna phase center locations 124 and an actual physical lateral position of the particular antenna 122, as shown in FIG. 1. The system 100 may be configured to determine a signal for the antenna array 120 based on the antenna phase center location weightings.

In a simplified scenario, for two antenna phase center locations 124, antenna phase center location weightings may be determined. If, for example, as shown in FIG. 1, a shift distance 134 that favors (e.g., is close to) a particular antenna 122 (the second lowest antenna) is used, then the signal transmitted by that particular antenna 122 may have an antenna phase center location weighting that more heavily favors (e.g., more heavily weighted to) that antenna phase center location 124 than other antennas such as the third lowest antenna. For instance, the second lowest antenna 122 may have an antenna phase center location weighting of 0.6 for the antenna phase center location 124 immediately above it. The third lowest antenna 122 may only have an antenna phase center location weighting of 0.4 for that same antenna phase center location 124 due to being farther away. The signal (e.g., signal to be transmitted) from each antenna 122 may be based on all of the antenna phase center location weightings for a set of antenna phase center locations 124 (e.g., antenna phase center locations that are nearby that particular antenna 122) as well as based off of the magnitude (e.g., brightness) of the antenna phase center location. For example, for two nearby antenna phase center locations 124 with values of 0.1 and 0.2 and respective weighting of 0.7 and 0.3, the total signal for that antenna 122 may be 0.1*0.7+0.2*0.3=0.13. In this regard, each antenna 122 may have multiple antenna phase center location weightings for multiple antenna phase center locations 124. Each antenna phase center location 124 may, in a sense, by transmitted by a set of antennas 122. The set of antennas 122 may be the nearest 2, nearest 3, nearest 4, nearest 16, and/or the like. For example, a two-by-two grid, or three-by-three grid of antennas 122 may be configured by the controller 102 to have an antenna phase center location weighting for a particular antenna phase center location 124 near the center of such a grid. The grids for each antenna phase center location 124 may overlap each other. In this way, each antenna phase center location 124 may be controlled by multiple antennas 122 and each antenna 122 may control for many antenna phase center locations 124 In this way, the weightings of a particular antenna 122 are based on adjacent antenna phase center locations 124 corresponding to adjacent antennas 122. In some embodiments, each antenna phase center location 124 may be nominally paired with an antenna 122.

The antenna weights may include at least one of amplitude weightings or phase weightings. For example, the amplitude (and/or phase) of each antenna 122 may be adjusted to shift an (otherwise nominal) phase center location 124 of an antenna 122 or set of antennas 122. Phase weightings includes time-shifting a signal of an antennas 122. For example, as an example, for electronically scanned antennas (ESAs), duplicate signals are sent to multiple antennas, but phase shifted to steer the beam. Amplitude weightings may be illustrated by the example above (e.g., 0.1*0.7+0.2*0.3=0.13), such that the closer the antenna phase center location 124 is to an antenna 122 and the higher its amplitude (e.g., simulated intensity), the higher amplitude of signal is transmitted from the antenna 122.

In some embodiments, the antenna weightings are configured to shift the projected scene 160 (e.g., entire projected scene 160) a shift distance 134 that is less than an antenna pitch 132 between the antennas 122. In some embodiments, the antenna weightings are configured to shift one or more sub-scene objects (e.g., an aircraft as shown in FIG. 2) of the projected scene 160 a shift distance 134 that is less than an antenna pitch 132 between the antennas 122. For example, antenna phase center location shifting can be done in zones defined by object boundaries of each object in the scene 160 such that different objects may be shifted in different directions and/or at different rates.

In some embodiments, the system 100 is configured to iteratively move the antenna phase center location 124 between particular antennas 122 by generating successive antenna weightings corresponding to successive frames of the antenna phase center location 124 between the particular antennas 122. For example, an object or scene 160 may be shifted a distance 134 less than an antenna pitch 132, multiple times to smoothly move the object or scene 160 over time, rather than moving an entire antenna pitch 132 at a time.

In some embodiments, the system 100 is configured to direct a transmission of the signal via the antenna array 120, where the signal is a radio frequency (RF) signal. For example, the controller may multiply the antenna weightings with antenna phase center location values (e.g., 0.1*0.7+0.2*0.3=0.13) for each antenna 122, to calculate signals to be transmitted by each antenna 122.

Consider, as a following example, a scenario where an angular resolution is improved using embodiments herein. In such a scenario, the antenna unit cell spacing (e.g., antenna pitch 132) is 0.29 inches. For a desired resolution of 0.25 milliradians, the required set-off distance 204 of a receiver 140 to the antenna array 120 is given by the equation: R=(antenna pitch)/(Radians)=0.29/0.00025=1160 inches=96.67 feet. For a projected scene 160 out to 100 km, for example, the base lattice dimension size 132 (i.e., distance between each antenna 122 at the projected distance 206) will emulate the following distances(S): S=100 kilometers*0.00025 radians=25 meters. This would limit the resolution of each antenna phase center location of a scene at 100 km to be 25 meters between each antenna phase center location, meaning the movement of any object at this distance would (without the benefit of the present disclosure) move at 25 meter jumps per transmission.

However, with embodiments herein, which may use non-uniform aperture illumination phase center control, the unit cell resolution may be, for example but not necessarily limited to, reduced by up to a factor of four (or more). Now consider, a similar scenario with the same antenna pitch 132 and desired resolution as the one above, but using non-uniform aperture illumination phase center control corresponding to antenna weightings. For example, this new embodiment would allow for placement of antenna phase center locations at much finer intervals, and would allow for antenna phase center placement at intervals of 25/4=6.25 meters.

Figure 3:
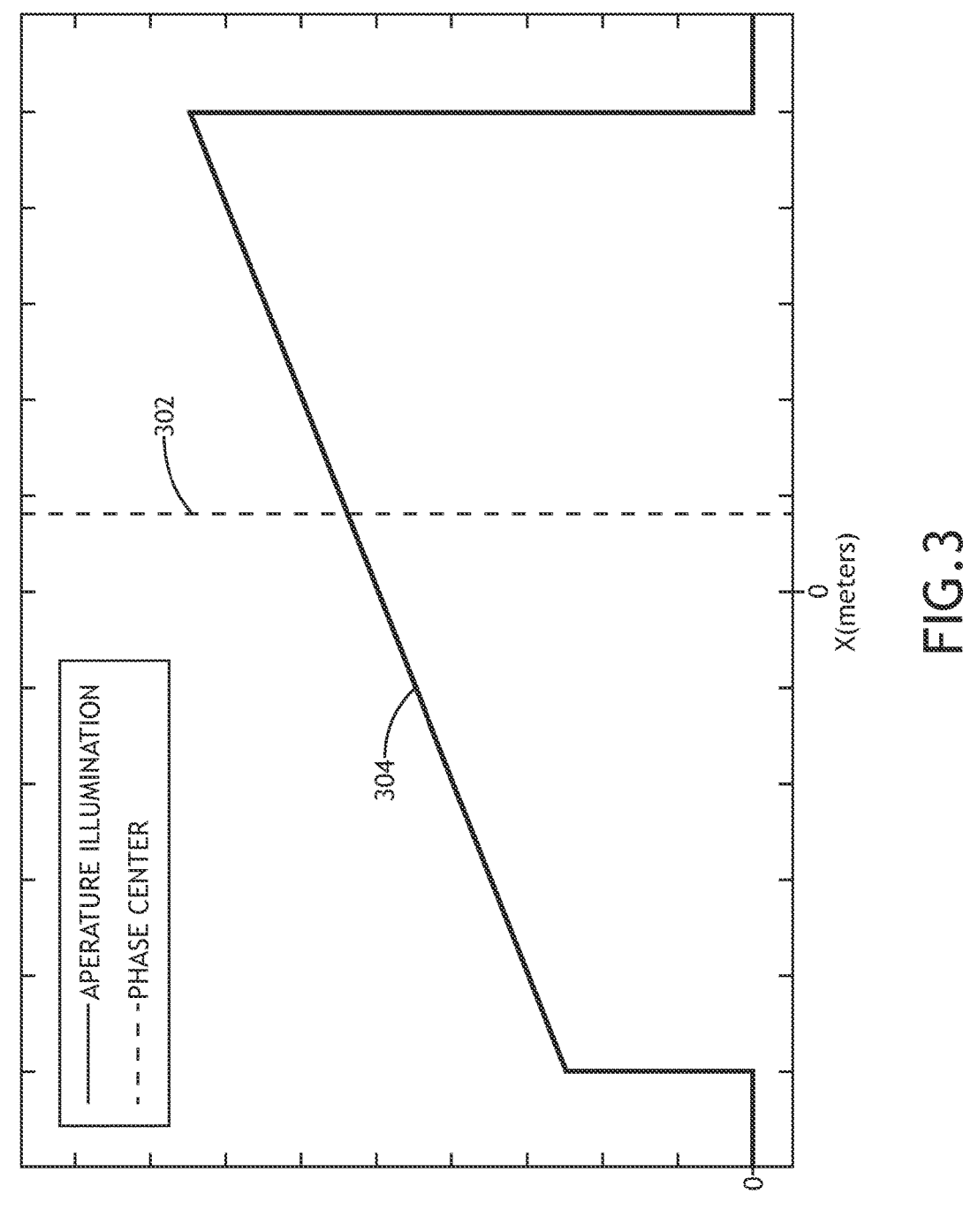
FIG. 3 is a graphical representation of a non-uniform tapered aperture illumination configured to adjust a perceivable antenna phase center location, in accordance with one or more embodiments of the present disclosure.

In some embodiments, a non-uniform aperture illumination is used, such as shown in FIG. 3.

FIG. 3 illustrates a graphical representation 300 of a non-uniform tapered aperture illumination 304 configured to adjust a location 124 of an antenna phase center, in accordance with one or more embodiments of the present disclosure. The graphical representation 300 showcases the phase center movement capability with amplitude only weighting control.

As shown, the non-uniform tapered aperture illumination 304 causes the phase center 302 to shift a distance (x) away from a nominal position of 0 meters on the horizontal axis. The example shift in phase center corresponds to about 0.08 meters of shift and is reproduced from Doerry, A. W., & Bickel, D. L., "Antenna Phase Center Locations in Tapered Aperture Subarrays", presented at the SPIE Defense & Security Symposium 2016 held Apr. 17-21, 2016 in Baltimore, MD. SAND2016-0325C, 618458. In some examples, the antenna array 120 includes contiguous but non-overlapping sub-apertures, such as one for each antenna 122 or one for a sub-set of antennas 122.

The one or more processors 106 of controller 102 may include any one or more processing elements known in the art. In this sense, the one or more processors 106 may include any microprocessor device configured to execute algorithms and/or instructions. In one embodiment, the one or more processors 106 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium (e.g., memory 104). Moreover, different subsystems of the system 100 may include processor or logic elements suitable for carrying out at least a portion of the steps described throughout the present disclosure. Therefore, the above description should not be interpreted as a limitation on the present invention but merely an illustration.

The memory medium 104 may include any storage medium known in the art suitable for storing program instructions executable by the associated one or more processors 106. For example, the memory medium 104 may include a non-transitory memory medium. For instance, the memory medium 104 may include, but is not limited to, a read-only memory, a random access memory, a magnetic or optical memory device (e.g., disk), a magnetic tape, a solid state drive and the like. In another embodiment, it is noted herein that the memory 104 is configured to store one or more results from the system 100 and/or the output of the various steps described herein. It is further noted that memory 104 may be housed in a common controller housing with the one or more processors 106. In an alternative embodiment, the memory 104 may be located remotely with respect to the physical location of the processors and controller 102. For instance, the one or more processors 106 of controller 102 may access a remote memory (e.g., server), accessible through a network (e.g., internet, intranet and the like). In another embodiment, the memory medium 104 stores the program instructions for causing the one or more processors 106 to carry out the various steps described through the present disclosure.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

In another embodiment, the controller 102 of the system 100 may be configured to receive and/or acquire data or information from other systems by a transmission medium that may include wireline and/or wireless portions. In another embodiment, the controller 102 of the system 100 may be configured to transmit data or information (e.g., the output of one or more processes disclosed herein) to one or more systems or subsystems by a transmission medium that may include wireline and/or wireless portions. In this manner, the transmission medium may serve as a data link between the controller 102 and other subsystems of the system 100. Moreover, the controller 102 may send data to external systems via a transmission medium (e.g., network connection).

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments", "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for controlling an antenna phase center location of a projected scene using radio frequency (RF) signals, the system comprising:

an antenna array configured to transmit the projected scene including a plurality of antenna phase center locations, wherein the antenna array comprises a plurality of antennas in an arrangement; and a controller operatively coupled to the antenna array, the controller including one or more processors and a memory coupled to the one or more processors, wherein the controller is configured to:

determine antenna phase center location weightings corresponding to the plurality of antennas, wherein particular antenna phase center location weightings corresponding to a particular antenna are based on distances between perceived lateral positions of particular antenna phase center locations and an actual lateral position of the particular antenna, wherein the perceived lateral positions correspond to virtual positions where a receiver is configured to perceive a signal to be originating from, wherein each antenna has multiple antenna phase center location weightings for multiple antenna phase center locations;

determine, for each antenna, the signal to be transmitted based on all of the antenna phase center location weightings for a set of antenna phase center locations as well as based on a magnitude of each antenna phase center location of the set of antenna phase center locations, wherein the antenna phase center location weightings are configured to shift the projected scene a shift distance that is less than an antenna pitch between the plurality of antennas; and direct a transmission of the signal via the antenna array, wherein the signal is a radio frequency (RF) signal.

2. The system of claim 1, wherein the antenna phase center location weightings are configured to shift a sub-scene projected object of the projected scene a shift distance that is less than an antenna pitch between the plurality of antennas.

3. The system of claim 1, wherein the antenna array is further configured to receive a received transmission.

4. The system of claim 3, wherein the system is configured to generate the projected scene based on the received transmission.

5. The system of claim 4, wherein the generating of the projected scene is based on the received transmission to emulate a simulated reflection of the received transmission off a simulated scene.

6. The system of claim 3, wherein the system is configured to respond to a pulsed radar transmission.

7. The system of claim 1, wherein the antenna phase center location weightings comprise at least one of:

amplitude weightings or phase weightings.

8. The system of claim 1, wherein the system is configured to iteratively move an antenna phase center location between particular antennas by generating successive antenna phase center location weightings corresponding to successive frames.

9. The system of claim 1, wherein the arrangement of the plurality of antennas is rectangular.

10. The system of claim 1, wherein an antenna pitch between the plurality of antennas comprises a first antenna pitch orthogonal to a second antenna pitch.

11. The system of claim 1, wherein the antenna phase center location weightings of a particular antenna are based on adjacent antenna phase center locations corresponding to adjacent antennas.

12. The system of claim 1, wherein the system is configured for non-uniform aperture illumination.

13. The system of claim 12, wherein the non-uniform aperture illumination comprises tapered non-uniform aperture illumination.

14. The system of claim 12, wherein the antenna phase center location weightings are based on the non-uniform aperture illumination.

15. A method for controlling an antenna phase center location of a projected scene using radio frequency (RF) signals, the method comprising:

determining antenna phase center location weightings corresponding to a plurality of antennas in an antenna array, wherein each antenna is separated by an antenna pitch and the antenna phase center location weightings corresponding to a particular antenna are based on distances between perceived lateral positions of particular antenna phase center locations and an actual lateral position of the particular antenna, wherein the perceived lateral positions correspond to virtual positions where a receiver is configured to perceive a signal to be originating from, wherein each antenna has multiple antenna phase center location weightings for multiple antenna phase center locations;

generating, for each antenna, the signal to be transmitted based on all of the antenna phase center location weightings for a set of antenna phase center locations as well as based on a magnitude of each antenna phase center location of the set of antenna phase center locations wherein the antenna phase center location weightings are configured to shift the projected scene a shift distance that is less than an antenna pitch between the plurality of antennas; and directing a transmission of the projected scene, including a plurality of antenna phase center locations, via the antenna array by transmitting the signal, wherein the signal is a radio frequency (RF) signal.

16. The method of claim 15, further comprising shifting a sub-scene projected object of the projected scene a shift distance that is less than an antenna pitch between the plurality of antennas based on the antenna phase center location weightings.

17. The method of claim 15, further comprising receiving a transmission through the antenna array and generating the projected scene based on the received transmission.

18. The method of claim 17, further comprising emulating a simulated reflection of the received transmission off a simulated scene based on the received transmission to generate the projected scene.

* * * * *